United States Patent [19]

Veale

[11] 3,938,447

[45] Feb. 17, 1976

[54] ARTICLE TRANSPORTING APPARATUS
[75] Inventor: Robert E. Veale, Hollis, N.H.
[73] Assignee: Brodie, Inc., Woburn, Mass.
[22] Filed: June 17, 1974
[21] Appl. No.: 479,593

[52] U.S. Cl.............. 105/156; 104/89; 198/177 T; 211/115
[51] Int. Cl.² .......................................... B61B 3/00
[58] Field of Search ........ 104/97, 89; 105/148, 149, 105/150, 152, 154, 156, 242; 198/177 R, 177 T; 294/82 R, 83 R; 214/658; 211/1.5, 95, 97, 113, 115, 121; 194/67; 267/141, 153

[56] References Cited
UNITED STATES PATENTS

| | | | |
|---|---|---|---|
| 1,028,988 | 6/1912 | Borgen | 105/242 |
| 1,775,429 | 9/1930 | Harris | 105/152 |
| 2,077,601 | 4/1937 | Whitlock et al. | 194/67 X |
| 2,608,164 | 8/1952 | Johnston | 105/242 |
| 3,001,634 | 9/1961 | Bauder | 104/89 X |
| 3,565,240 | 2/1971 | Nearman | 105/154 X |
| 3,742,738 | 7/1973 | Frotriede | 105/156 X |

*Primary Examiner*—Robert J. Spar
*Assistant Examiner*—Randolph A. Reese
*Attorney, Agent, or Firm*—Wolf, Greenfield & Sacks

[57] ABSTRACT

The apparatus is used in a trolley conveying system for transporting various types of article, and in particular garments, between different locations. The apparatus comprises and is supported by a top load bar which has a detent plate supported therefrom by means of a yoke structure. The detent plate has a circular opening for accommodating a swivel assembly including an elongated support rod at the bottom thereof for holding articles preferably at either end thereof.

15 Claims, 5 Drawing Figures

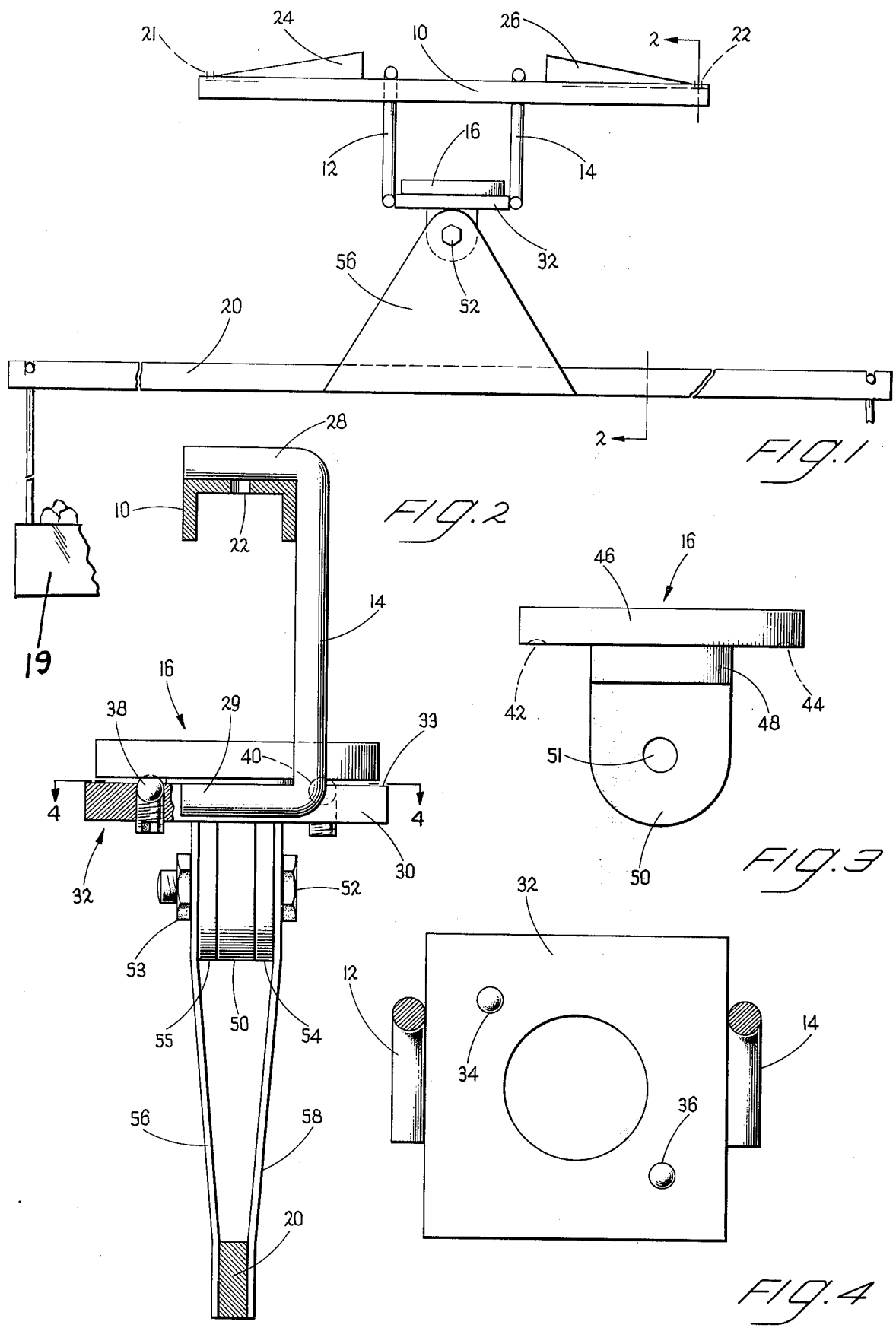

ARTICLE TRANSPORTING APPARATUS

BACKGROUND OF THE INVENTION

The present invention relates in general to an article transporting apparatus. More particularly, the invention relates to such an apparatus which is for use with a standard garment trolley system.

The prior art conveying or supporting apparatus of the type disclosed herein is characterized by certain problems. For example, these prior art apparatus are sometimes unstable especially when articles are being transported between different levels in a building. Also, the supporting part of the apparatus is sometimes too easily rotatable and yet in other cases access to the supporting member is not provided in all directions.

Accordingly, one object of the present invention is to provide an improved article transporting apparatus which is preferably for supporting garments.

Another object of the present invention is to provide an article transporting apparatus that permits movement between different levels of a building without causing a rocking of the structure.

A further object of the present invention is to provide an apparatus for transporting articles and that is easily rotatable and yet is capable of being suitably locked in different predetermined positions.

SUMMARY OF THE INVENTION

To accomplish the foregoing and other objects of this invention there is provided an apparatus for transporting articles by means of a trolley member. This apparatus comprises support means including means for receiving the trolley member so that the support means may travel with the trolley member. A plate is provided and has associated therewith, means for fixedly supporting the plate a predetermined distance below the support means. The plate is preferably square and is provided with a centrally disposed hole therethrough. The plate supports a swivel support assembly which includes a cap member having a flanged portion for engagement with a top surface of the plate and a main portion received by the opening in the plate and extending below the plate. The swivel support assembly also comprises an elongated bar and means including a pivot member interconnecting the elongated bar and a bottom end of the main portion of the cap member. The pivot member permits the elongated support to pivot relative to the cap member. The pivot member preferably includes a pair of resilient grommets that tend to damp the pivot action to prevent rocking motion. The upper portion of the cap member and the plate are preferably interlocked in detented positions but are permitted to rotate relatively through the full 360°.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 shows one embodiment for the apparatus of the present invention;

FIG. 2 is a cross-section view taken along line 2—2 in FIG. 1;

FIG. 3 shows one of the components of the apparatus, namely the cap member;

FIG. 4 is a cross-sectional view taken along line 4—4 of FIG. 2; and

DETAILED DESCRIPTION

Figure 5:
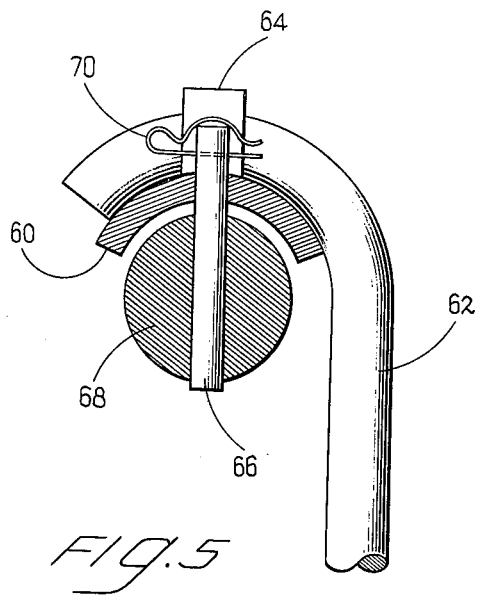
FIG. 5 is a fragmentary view similar to a portion of the apparatus shown in FIG. 2 including means for attaching the apparatus to a trolley rod.

FIG. 1 shows the apparatus of the present invention which comprises a load bar 10, yokes 12 and 14, cap member 16, and support bar 20. The load bar 10 may have a cross-section as shown in FIG. 2. The bar 10 has end holes 21 and 22 for facilitating attachment of the load bar to the trolley rod. The trolley rod is not shown in FIG. 1 but is depicted in the fragmentary view of FIG. 5. A pair of weight spreaders 24 and 26 may be suitably attached to the top of the load bar 10. These pieces are preferably made of metal and thus the weight spreaders 24 and 26 may be welded to the load bar 10. Similarly, the yokes 12 and 14 may be welded at their top ends to the load bar 10.

One of the yokes is shown in FIG. 2 and comprises a top section 28 which attaches to the load bar and a bottom section 29 which may be welded or attached by other suitable means to an outer edge 30 of support plate 32. The support plate 32 is also shown in FIG. 4 with the yokes 12 and 14 secured at opposite sides thereof. As indicated in FIGS. 2 and 4, the plate 32 has two diametrically disposed apertures 34 and 36 which may be threaded to receive screw members 38 and 40. Each of the screw members includes a top circular ball section which protrudes above the top surface 33 of the plate 32. The tops of these screws 38 and 40 are disposed to fit within corresponding diametrically disposed detents 42 and 44 in the cap member 16, shown in FIG. 3. This cap member 16 generally comprises a top portion 46 having the detents therein, an intermediate portion 48 which is of cylindrical shape and a bottom straight walled portion 50 which is shown in FIGS. 2 and 3. The portion 50 includes an aperture 51 for accommodating bolt 52. Bolt 52 typically has a nut 53 secured to the end thereof. A pair of rubber grommets 54 and 55 are assembled intermediate the bottom portion 50 and the arms 56 and 58. FIG. 1 shows the triangular shape of these arms. The arms 56 and 58 are suitably attached such as by welding at their bottom end to the support bar 20. Bar 20 has notches at opposite ends as shown in FIG. 1 for accommodating the basket 19 by means of a pair of hangers engaged by the notches.

FIG. 5 shows a fragmentary view of a portion of the apparatus depicted in FIG. 2. In this embodiment, the load bar 60 has an arcuate shape and the yoke 62 has a similar arcuate shape. FIG. 5 also shows the weight spreader 64 and a garment pin 66 which fits through an aperture in the load bar 60 and engages with a hole in the trolley rod 68. The garment pin 66 may have a hole drilled at the top end thereof for accommodating a clip pin 70 which fits through the hole in the top end of the garment pin and prevents the apparatus from separating from the trolley rod. The trolley rod forms a part of a well known trolley system such as shown in U.S. Pat. No. 3,742,738. So that the present invention is not obscured, the description of the known trolley system has not been discussed in any detail herein.

One of the important features of the present invention resides in the use of the grommets 54 and 55. This arrangement in association with the bolt 52, provides a damping of rotation of the bar 20 thereby permitting the apparatus to move from one floor level to another without undue rocking. It is noted in this connection, as shown in FIG. 1, that with the triangular shape of the arms 56 and 58 and the size of the aperture in plate 32, that the assembly including the bar 20 can pivot freely through a small predetermined angle.

Another feature of the present invention is concerned with the detent arrangement that provides for a detented interlocking in predetermined positions between the non-rotatable plate 32 and the rotatable cap member 16. In the preferred embodiment, the cap member 16 has four detents spaced at 90° angles. When there is a load on the bar 20 this causes a positive engagement between the cap and plate therebelow when the detents are engaged by the screw members 38 and 40. This permits 360° movement of the load bar 20 preventing unnecessary rotation by means of the detent arrangement.

Another advantageous feature of the present invention is that the apparatus can be used with the conventional garment pins. Thus, the apparatus can be readily removed from the trolley bar so that other use can be made thereof.

Having described the preferred embodiment of the present invention, it should now be obvious to those skilled in the art that numerous modifications can be made in this embodiment, all of which are contemplated as falling within the scope of the present invention.

What is claimed is:

1. An article transporting apparatus supported by a trolley member and comprising;
    support means including means for receiving said trolley member so that said support means may travel with the trolley member and a plate means having a hole therein,
    and a swivel support assembly including a cap member having means for engagement with a top surface of the plate means, means slidable in the hole and a lower end extending below the plate means, a support bar means for pivotally supporting the bar from the lower extending end of the cap member, and resilient means disposed between the means for pivotally supporting and the lower extending end of the cap member for dampening rotation therebetween,
    whereby the cap member is capable of movement relative to the plate means to permit relative turning therebetween.

2. The apparatus of claim 1 wherein said cap member includes a top flanged portion having a peripheral surface resting on the surface of the plate means about the hole.

3. The apparatus of claim 2 wherein the top flanged portion and the plate means each have mating interlocking means for selectively holding the cap member in different fixed positions relative to the plate means.

4. The apparatus of claim 3 wherein the mating interlocking means comprises a rounded protrusion of the plate means and a detent of the top flanged portion.

5. The apparatus of claim 4 wherein the plate means includes two diametrically disposed threaded holes for accommodating screw members defining at one end the rounded protrusion.

6. The apparatus of claim 5 wherein the top flanged portion has four recessed detents spaced at 90° intervals about the lower surface thereof.

7. The apparatus of claim 6 wherein the cap member also comprises a cylindrical center section for fitting within the hole in the plate means.

8. The apparatus of claim 7 wherein the lower extending end of the cap member has a hole therein for accommodating a bolt which comprises the pivotally supporting means.

9. The apparatus of claim 8 wherein the means for pivotally supporting also comprises a pair of triangularly shaped spaced arms connecting to the support bar and having a hole in their apex to accommodate the bolt.

10. The apparatus of claim 1 wherein said means for pivotally supporting includes a pivot pin and means connecting from the support bar and having a top end for receiving the pivot pin, said lower extending end of the cap member also having a hole for accommodating the pivot pin.

11. An article transporting apparatus supported by a trolley member and comprising;
    support means including means for receiving said trolley member so that said support means may travel with the trolley member, plate means having a hole therethrough and two diametrically disposed threaded holes, and screw members disposed in the threaded holes having one end defining a rounded protrusion extending above the top surface of the plate means,
    a swivel support assembly including a cap member including a top flanged portion having a peripheral surface resting on the surface of the plate means and four detents spaced at 90° intervals about the lower surface thereof for mating with the rounded protrusions, a cylindrical center section for fitting within the hole in the plate means, and a lower end extending below the plate means and having a hole therethrough,
    a support bar,
    a pair of triangularly shaped spaced arms connecting to the support bar and having a hole in their apex,
    a bolt for passing through the holes in the arms and lower end for pivotally supporting the support bar,
    and a pair of resilient grommets spaced between the arms and lower extending section of the cap member to dampen rotation between the arms and cap member.

12. The apparatus of claim 11 wherein the means for receiving the trolley member has holes at its opposite ends for receiving garment pins.

13. The apparatus of claim 12 wherein the support means further comprises a pair of yoke means interconnecting the receiving means and plate means.

14. An article transporting apparatus supported by a trolley member and comprising;
    support means including means for receiving said trolley member so that said support means may travel with the trolley member and a plate means having a hole therein,
    and a swivel support assembly including a cap member having means for engagement with a top surface of the plate means, means slidable in the hole and a lower end extending below the plate means, a support bar and means for pivotally supporting the bar from the lower extending end of the cap member,
    whereby the cap member is capable of movement relative to the plate means to permit relative turning therebetween, said means for pivotally supporting including a pivot pin and means connecting from the support bar and having a top end for receiving the pivot pin, the lower extending end of the cap member also having a hole for accommodating the pivot pin, and resilient means spaced intermediate the lower extending end of the cap member and the top end of the connecting means for dampening rotation therebetween.

15. The apparatus of claim 14 wherein the connecting means includes a pair of triangularly shaped spaced arms.

* * * * *